(12) United States Patent
Nagy et al.

(10) Patent No.: US 9,374,703 B2
(45) Date of Patent: Jun. 21, 2016

(54) CUSTOMIZABLE SERVICEABILITY MECHANISM (71) Applicant: International Business Machines Corporation, Armonk, NY (US)

(72) Inventors: William A. Nagy, Mercer Island, WA (US); Paul J. Reder, Hillsborough, NC (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 14/104,446

(22) Filed: Dec. 12, 2013

(65) Prior Publication Data
US 2015/0169785 A1 Jun. 18, 2015

(51) Int. Cl.
*H04W 8/24* (2009.01)
*H04L 29/06* (2006.01)
*G06F 17/30* (2006.01)
*H04L 29/08* (2006.01)
*H04W 88/02* (2009.01)

(52) U.S. Cl.
CPC .......... *H04W 8/24* (2013.01); *G06F 17/30867* (2013.01); *H04L 67/04* (2013.01); *H04L 67/42* (2013.01); *H04W 88/02* (2013.01)

(58) Field of Classification Search
CPC .............. G06F 17/30867; G06F 17/30997; G06F 17/30017; G06F 17/30554
USPC ......................................................... 707/754
See application file for complete search history.

(56) References Cited

U.S. PATENT DOCUMENTS

| 2003/0229549 | A1* | 12/2003 | Wolinsky ........... G06Q 30/0248 705/14.61 |
| 2007/0156390 | A1 | 7/2007 | Guenthner et al. |
| 2012/0330640 | A1 | 12/2012 | Alpem et al. |
| 2013/0227352 | A1* | 8/2013 | Kumarasamy ...... G06F 11/3072 714/47.1 |

OTHER PUBLICATIONS

Slegel et al., "The IBM eServer z990 microprocessor," IBM Corporation; IBM Journal Research & Development, vol. 48, No. 3/4, May/Jul. 2004, pp. 295-309.

* cited by examiner

*Primary Examiner* — Hosain Alam
*Assistant Examiner* — Tuan-Khanh Phan
(74) *Attorney, Agent, or Firm* — VanLeeuwen & VanLeeuwen; Richard A. Wilhelm (57) ABSTRACT An approach is provided in which a mobile device collects serviceability data from applications executing on the mobile device based upon one or more serviceability state changes provided by a server. The mobile device filters the collected serviceability data according to one or more collection filter rules provided by the server and, in turn, sends the filtered serviceability data to the server accordingly.

10 Claims, 11 Drawing Sheets

CUSTOMIZABLE SERVICEABILITY MECHANISM

BACKGROUND

In software engineering and hardware engineering, serviceability (also known as supportability) refers to the ability of technical support personnel to install, configure, and monitor computer products, identify exceptions or faults, debug or isolate faults to root cause analysis, and provide hardware or software maintenance in pursuit of solving a problem and restoring the product into service. Incorporating serviceability facilitating features typically results in more efficient product maintenance, reduces operational costs, and maintains business continuity.

On standard desktop environments with ample bandwidth and processing power, serviceability tasks tend to "overgather" information and filter the information later during data analysis. Desktop environments have a tendency to retain little or no information between various information gathering requests, thus incurring extra bandwidth and processing resources. This "grab it all and sort it later" approach is impractical for mobile devices where processing capacity and bandwidth is limited.

BRIEF SUMMARY

According to one embodiment of the present disclosure, an approach is provided in which a mobile device collects serviceability data from applications executing on the mobile device based upon one or more serviceability state changes provided by a server. The mobile device filters the collected serviceability data according to one or more collection filter rules provided by the server and, in turn, sends the filtered serviceability data to the server accordingly.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

Figure 1:
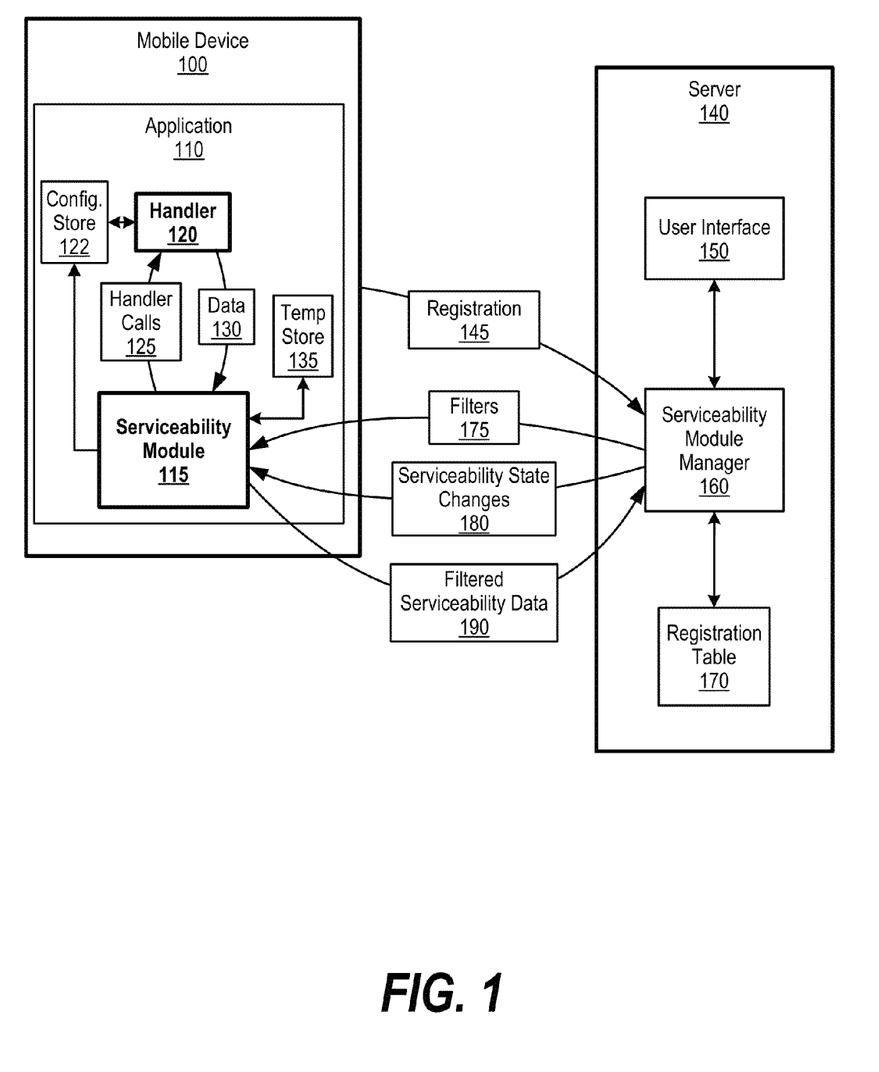
FIG. 1 is a diagram of a serviceability module installed on a mobile device that collects serviceability data and provides the serviceability data to a server.

FIG. 1 is a diagram of a serviceability module installed on a mobile device that collects serviceability data and provides filtered serviceability data to a server. Mobile device 100 includes application 110 that may be, for example, a recently released mobile application that a developer wishes to collect and debug real-time serviceability data.

Mobile device 100 registers application 110 with server 140 via registration 145. Registration 145 includes a device identifier (corresponding to mobile device 100) and an application identifier (corresponding to application 110). In turn, server 140's serviceability module manager 160 creates a registration table entry from the information included in registration 145 and stores the registration table entry in registration table 170. As a result, serviceability module manager 160 is able to identify mobile devices and applications that match filter requests received from a developer and send filters 175 (collection filter rules) and serviceability state changes 180 to mobile devices corresponding to the matched table entries (discussed below).

Mobile device 100's application 110 loads and initializes serviceability module 115, which may be a software module, a subroutine, etc., and may reside within application 110 or external to application 110. Serviceability module 115 initializes handler 120, which is responsible for collecting serviceability data based upon handler calls 125 sent from serviceability module 115 (discussed below). In one embodiment, each application executing on mobile device 100 includes a serviceability module and a handler. In another embodiment, mobile device 100 may execute a system wide serviceability module and handler that supports each of the applications executing on mobile device 100.

Server 140 includes user interface 150, which allows a developer to specify "filter rules" corresponding to various applications and/or mobile devices. In one embodiment, the filter rules may include "high level" identifiers such as device identifiers and/or application identifiers. In another embodiment, the collection filter rules may also include "low level" mode identifiers such as "vibrate mode on", which instructs a mobile device as to which circumstances or modes to collect the serviceability data.

When server 140 receives a filter request from a developer via user interface 150, serviceability module manager 160 scans registration table 170 for table entries that match the filter request. In one embodiment, the filter request not only specifies what characteristics to use in generating the list of matches, but also specifies attributes that mobile devices should collect (e.g., only collect configuration files from matching devices/applications). In turn, serviceability module manager 160 sends filters 175 (collection filter rules) to mobile devices (mobile device 100) corresponding to the matched table entries. Filters 175 may include application identifiers, mode identifiers (e.g., collect data when vibrate mode on), data attribute identifiers (e.g., collect configuration files), etc. Serviceability module 115 stores filters 175 for later data filtering steps as discussed below.

Serviceability module 115 receives a request from server 140 to begin data collection via serviceability state changes 180, which may specify interval collection information such as to begin collecting serviceability data at 5-minute intervals. As such, serviceability module 115 sends handler call 125 to handler 120 to begin collecting serviceability data. Handler 120 retrieves configuration information from configuration store 122 that indicates a serviceability level and the rate at which to collect serviceability data. In one embodiment, serviceability module 115 loads the configuration information in configuration store 122 when it receives filters 175.

Handler 120, in turn, collects serviceability data based on the current serviceability level and specified interval, and provides the serviceability data (data 130) to serviceability module 115. Serviceability module 115 filters the data according to collection filter rules (filters 175) and stores the filtered serviceability data in temporary store 135 accordingly (see FIG. 4 and corresponding text for further details.

In time, serviceability module 115 receives a request to send the filtered serviceability data to server 140 (serviceability state change 180) such as, for example, when a developer wishes to receive the filtered serviceability data from mobile device 100. As such, serviceability module 115 receives and filters remaining available data from handler 120 and provides filtered serviceability data 190 to serviceability module manager 160 accordingly.

In one embodiment, serviceability module 115 compresses/encrypts the filtered serviceability data as required prior to sending the filtered serviceability data to server 140. In another embodiment, a priority is assigned to each serviceability data object collected by handler 120 to facilitate cache and storage maintenance. In this embodiment, some serviceability data objects may be discarded from temporary store 135 based on their priority if resources become constrained or configured thresholds are exceeded. In another embodiment, serviceability state change 180 may include information that specifies a reporting interval or cache size threshold corresponding to when serviceability module 115 should send the collected serviceability data to server 140. The thresholds may also be used to limit resource usage by the cache (resulting in lower priority serviceability data being discarded.

Figure 2:
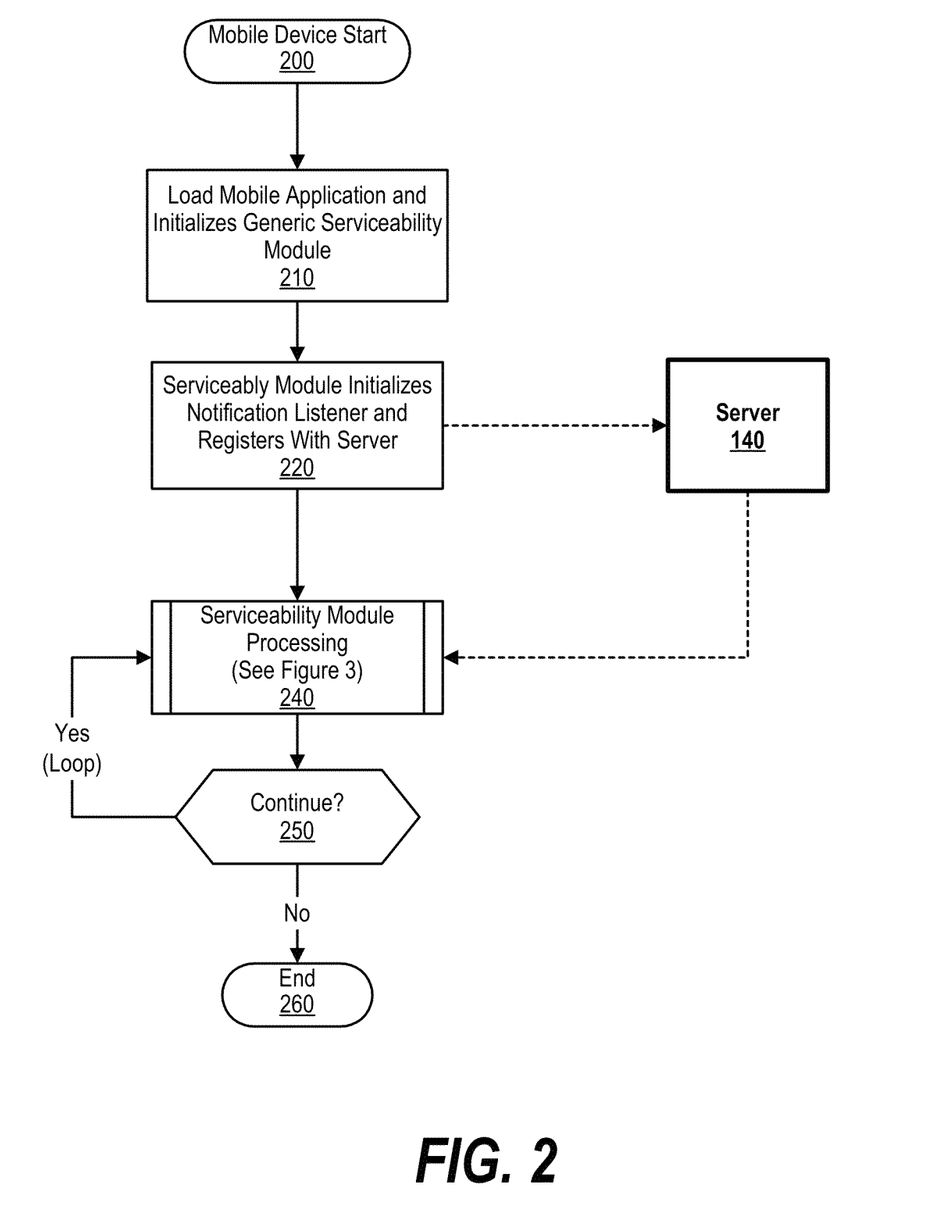
FIG. 2 is a flowchart showing one example of a mobile device application loading a serviceability module and performing serviceability tasks accordingly.

FIG. 2 is a flowchart showing one example of a mobile device application loading a serviceability module and performing serviceability tasks accordingly. Processing commences at 200, whereupon the mobile device loads application 110 and initializes serviceability module 115 (210). At 220, the serviceability module initializes a notification listener, which registers application 110 with serviceability module manger 160.

Figure 3:
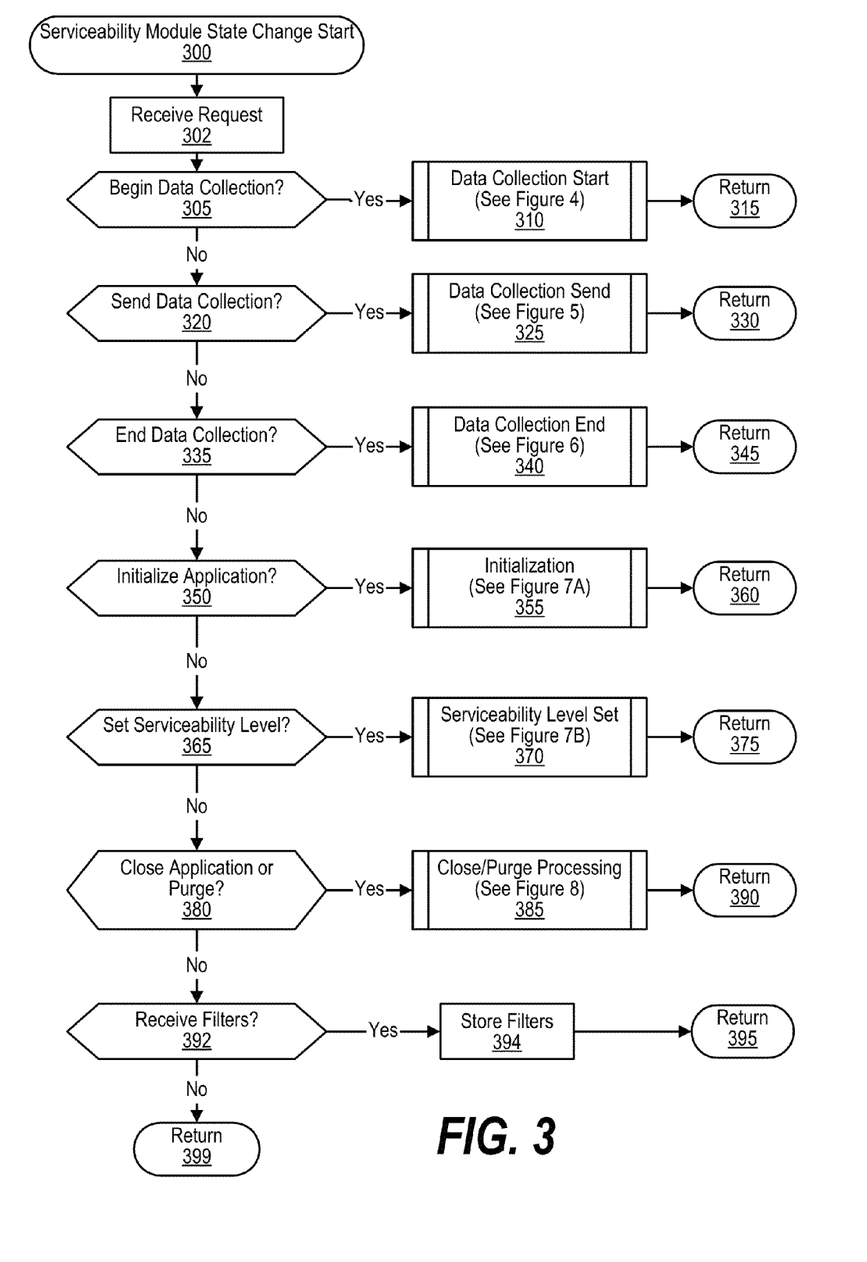
FIG. 3 is a flowchart showing steps taken by the serviceability module to process state changes generated by server 140.

In turn, the serviceability module receives and processes various commands, state changes, and filters provided by server 140 (pre-defined process block 240, see FIG. 3 and corresponding text for further details). A determination is made whether to continue serviceability processing (decision 250). If the mobile device should continue processing requests from server 140, decision 250 branches to the "No" branch, whereupon the mobile device's serviceability module/handler continue to process requests. This looping continues until the mobile device terminates serviceability processing (e.g., power turned off), at which point decision 250 branches to the "No" branch whereupon processing ends at 260.

FIG. 3 is a flowchart showing steps taken by the serviceability module to process application initializations and state changes generated by server 140. Processing commences at 300, whereupon the serviceability module receives a request from server 140 (or application 110) at step 302. A determination is made as to whether the request is a request to begin collecting data, such as to collect data from a particular application executing on the mobile device (decision 305). If the request is a request to begin collecting data, decision 305 branches the "Yes" branch, whereupon the serviceability module invokes handler 120 to begin collecting data (pre-defined process block 310, see FIG. 4 and corresponding text for further details). Processing returns at 315.

On the other hand, if the request is not a request to begin collecting data, decision 305 branches to the "No" branch, whereupon a determination is made as to whether the request is a request to send collected data to the server (decision 320), such as a request to send filtered serviceability data collected from a particular application. If the request is a request to send collected data, decision 320 branches the "Yes" branch, whereupon the serviceability module performs steps to send the collected data to the server (pre-defined process block 325, see FIG. 5 and corresponding text for further details). Processing returns at 330.

On the other hand, if the request is not a request to send collected data, decision 320 branches to the "No" branch, whereupon a determination is made as to whether the request is a request to end data collection, such as to end data collection from a particular application (decision 335). If the request is a request to end data collection, decision 335 branches the "Yes" branch, whereupon the serviceability module instructs handler 120 to stop collecting data (pre-defined process block 340, see FIG. 6 and corresponding text for further details). Processing returns at 345.

On the other hand, if the request is not a request to end data collection, decision 335 branches to the "No" branch, whereupon a determination is made as to whether the request is a request to initialize an application (e.g., from mobile device 100 or application 110) (decision 350). If the request is a request to initialize an application, decision 350 branches the "Yes" branch, whereupon the serviceability module performs steps to initialize the application (pre-defined process block 355, see FIG. 7A and corresponding text for further details). Processing returns at 360.

On the other hand, if the request is not a request to initialize an application, decision 350 branches to the "No" branch, whereupon a determination is made as to whether the request is a request to set a serviceability level (decision 365). For example, the request may be a change to start gathering debug level information versus simply gathering warnings and errors. In another example, the request may be to set a level of debug trace that is gathered (e.g., fine, finer, finest in most logger terms). If the request is a request to set a serviceability level, decision 305 branches the "Yes" branch, whereupon the serviceability module performs steps to set the requested serviceability level (pre-defined process block 370, see FIG. 7B and corresponding text for further details). Processing returns at 375.

On the other hand, if the request is not a request to set a serviceability level, decision 365 branches to the "No" branch, whereupon a determination is made as to whether the request is a request to close the application or purge the collected data (decision 380). If the request is a request to close the application or purge the collected data, decision 380 branches the "Yes" branch, whereupon the serviceability module performs steps to close the application or purge the collected data (pre-defined process block 385, see FIG. 8 and corresponding text for further details). Processing returns at 390.

On the other hand, if the request is not a request to close the application or purge the collected data, decision 380 branches to the "No" branch, whereupon a determination is made as to whether the request includes serviceability data filters (collection filter rules), such as a request to collect serviceability data during certain modes of operation (decision 392). If the request includes serviceability data filters, decision 392 branches the "Yes" branch, whereupon the serviceability module stores the filters for subsequent data filtering (394), and returns at 395. On the other hand, if the request does not include serviceability data filters, decision 392 branches to the "No" branch, whereupon processing returns at 399.

Figure 4:
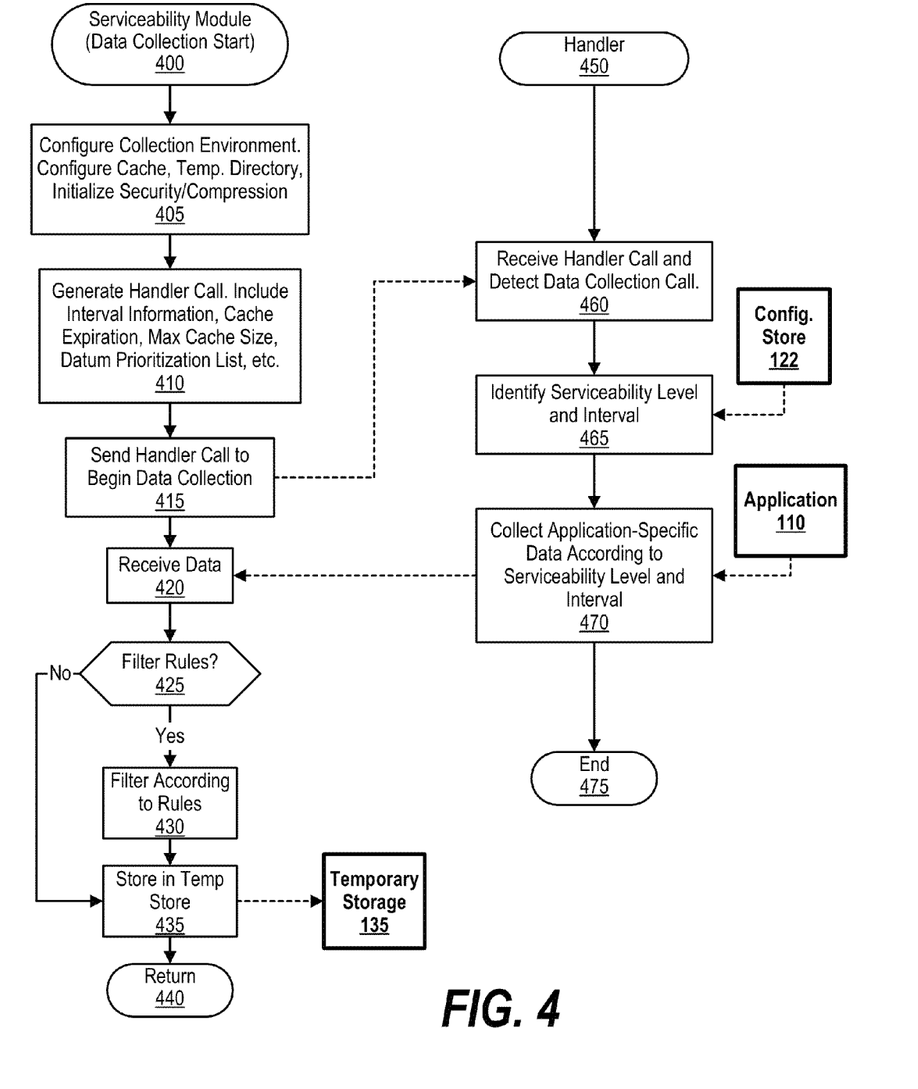
FIG. 4 is a flowchart showing one example of steps taken to collect data at a mobile device.

FIG. 4 is a flowchart showing one example of steps taken to collect data at a mobile device. Serviceability module processing commences at 400, whereupon the serviceability module configures a data collection environment by configuring a cache, temporary directory, and initializes security/compression according to configuration rules (405). At 410, the serviceability module generates a handler call that includes, for example, data collection interval information, a cache expiration, a maximum cache size, a datum prioritization list, and may include other configuration information required for handler 120 to collect and store correct data.

The serviceability module sends the handler call to handler 120 (step 415). Handler processing commences at 450, whereupon the handler receives the handler call at 460 and detects that the call is a data collection call. The handler, at 465, identifies the serviceability level and interval based on information in configuration store 122. In turn, the handler collects serviceability data from application 110 (470) according the serviceability level at the specified interval (e.g., every 10 minutes) until the handler receives a different handler call to terminate data collection (discussed below), in which case handler processing ends at 475.

Referring back to the serviceability module, the serviceability module receives the collected data from handler 120 at 420, and a determination is made as to whether the serviceability module should filter the data according to collection filter rules provided by server 140 (decision 425). If the serviceability module should filter the data, decision 425 branches to the "Yes" branch, whereupon the serviceability module filters the data according to the collection filter rules (430), and stores the filtered data in temporary store 135 at 435. On the other hand, if the serviceability should not filter the collected data, decision 425 branches to the "No" branch, bypassing filtering steps and stores the collected data in temporary store 135 at step 435. Serviceability processing returns at 440.

Figure 5:
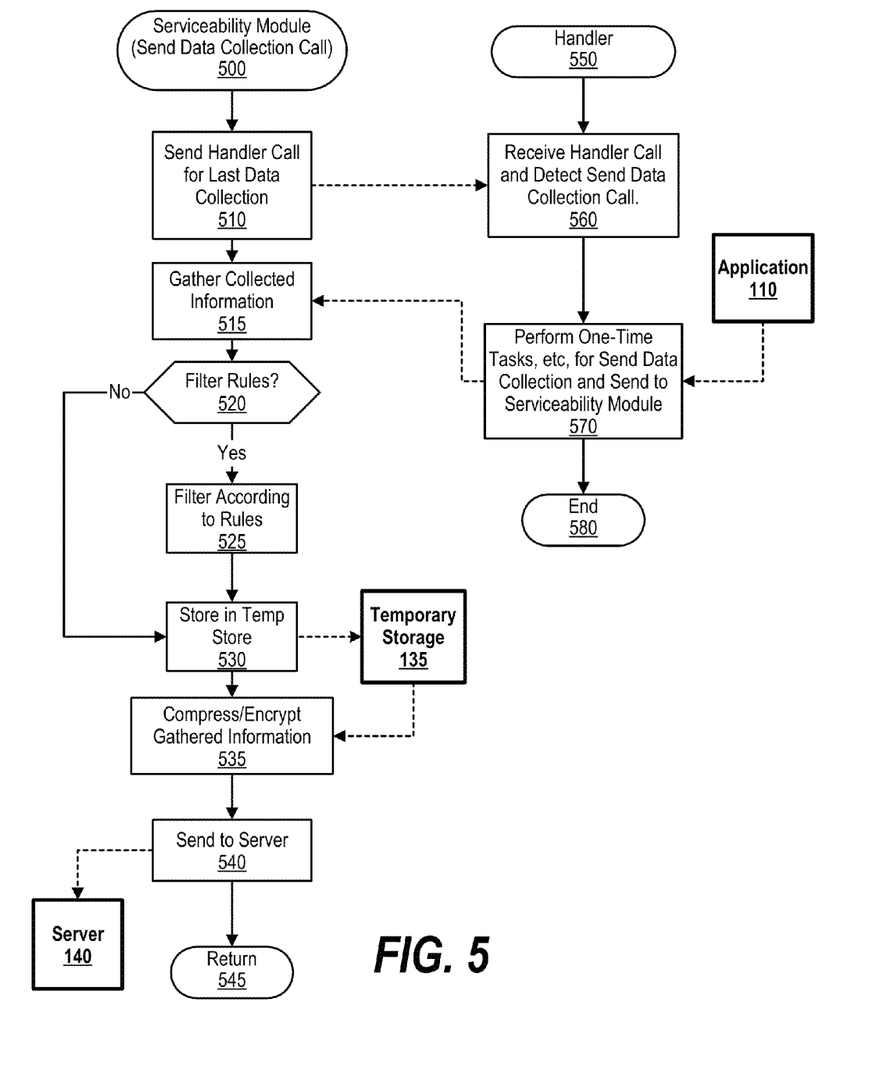
FIG. 5 is a flowchart showing one example of steps taken to send collected data from a mobile device's serviceability module to a server.

FIG. 5 is a flowchart showing one example of steps taken to send collected data from a mobile device's serviceability module to a server. Serviceability module processing commences at 500, whereupon the serviceability module sends a handler call to handler 120 for a last data collection (510). Handler processing commences at 550, whereupon the handler receives the call and detects that the call corresponds to sending the data to the server (560). At 570, the handler performs a one time (last) collection of data from application 110 and sends the collected data to the serviceability module. Handler processing ends at 580.

Referring back to the serviceability module, the serviceability module receives the collected data at 515, and, similar to the data collection process described in FIG. 4, a determination is made as to whether the serviceability module should filter the data according to collection filter rules provided by server 140 (decision 520). If the serviceability module should filter the data, decision 520 branches to the "Yes" branch, whereupon the serviceability module filters the data according to the collection filter rules (525), and stores the filtered data in temporary store 135 at 530. On the other hand, if the serviceability should not filter the collected data, decision 520 branches to the "No" branch, bypassing filtering steps and stores the collected data in temporary store 135 at step 530. At 535, the serviceability module compresses/encrypts the collected data according to one or more rules, and sends the compressed/encrypted data to server 140 at 540. In one embodiment, the serviceability module waits to send the compressed/encrypted data to server 140 until a time at which the connection between the mobile device and server is underutilized, such as when data traffic is low and/or when the mobile device is not in use. Serviceability module processing ends at 545.

Figure 6:
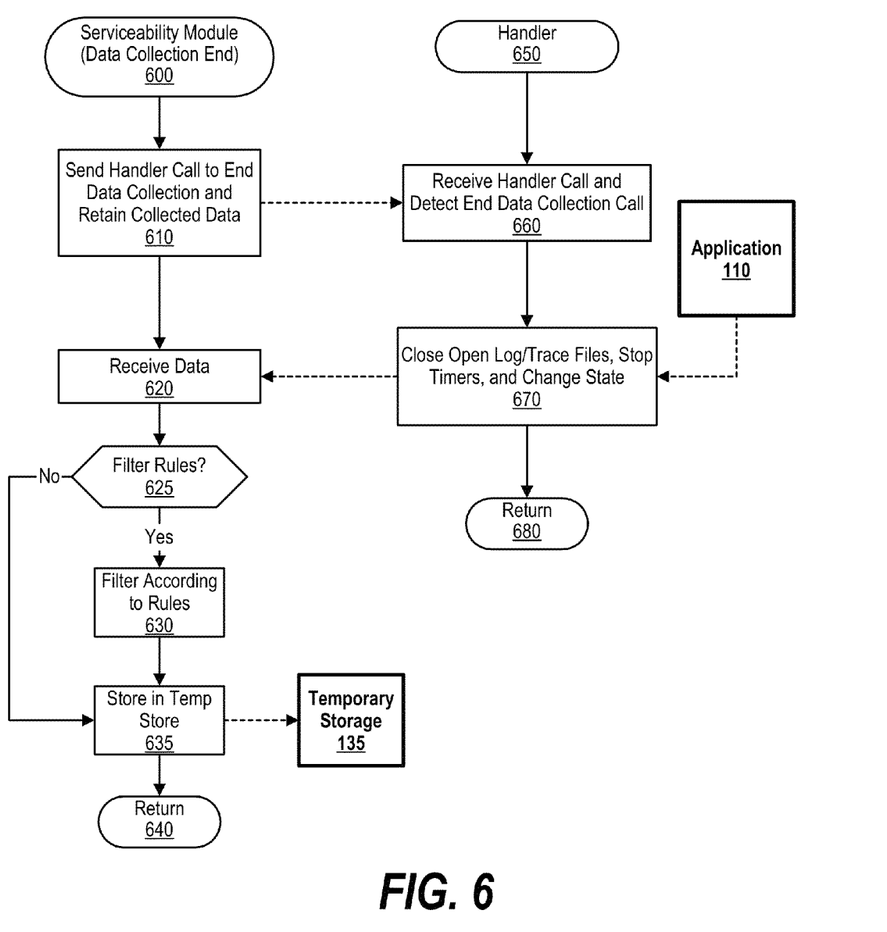
FIG. 6 is a flowchart showing one example of steps taken to end data collection on a mobile device.

FIG. 6 is a flowchart showing one example of steps taken to end data collection on a mobile device. Processing commences at 600, whereupon the serviceability module sends a handler call to handler 120 to end data collection (610). Handler processing commences at 650, whereupon the handler receives the call at 660. At 670, the handler closes open logs and trace files, stops timers, changes states, etc. to stop the data collection process. Handler processing ends at 680.

Referring back to the serviceability module, the serviceability module receives any last collected data from the handler at 620, and similar to the data collection process described in FIG. 4, a determination is made as to whether the serviceability module should filter the data according to collection filter rules provided by server 140 (decision 625). If the serviceability module should filter the data, decision 625 branches to the "Yes" branch, whereupon the serviceability module filters the data according to the collection filter rules (630), and stores the filtered data in temporary store 135 at 635. On the other hand, if the serviceability should not filter the collected data, decision 625 branches to the "No" branch, bypassing filtering steps and stores the collected data in temporary store 135 at step 635. Processing returns at 640.

Figure 7A:
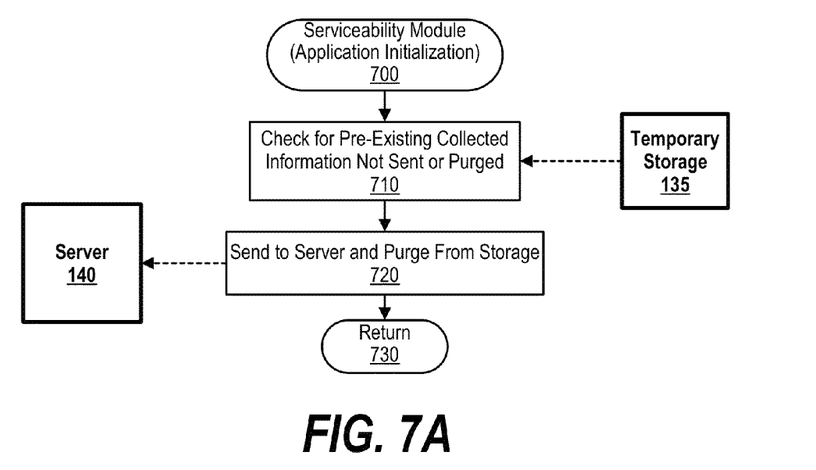
FIG. 7A is a flowchart showing one example of steps taken during application registration.

FIG. 7A is a flowchart showing one example of steps taken during application registration. Serviceability module processing commences at 700, whereupon the serviceability module checks temporary storage 135 for pre-existing collected data that has not been sent to server 140 or has not been purged (710). When the serviceability module identifies such data, the serviceability module sends the pre-existing collected data to server 140 and purges the data from temporary store 135 (720). Serviceability module processing returns at 730.

Figure 7B:
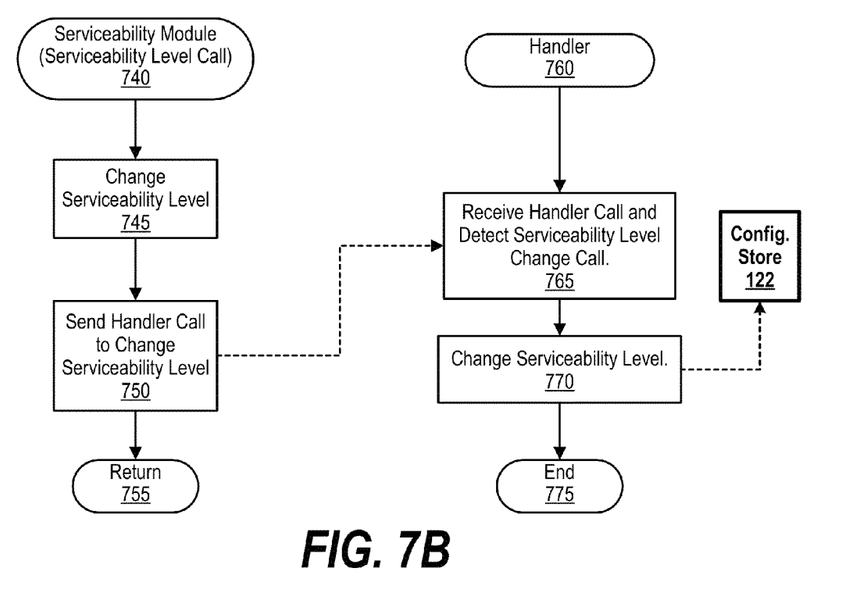
FIG. 7B is a flowchart showing one example of steps taken to change the serviceability level of data collection.

FIG. 7B is a flowchart showing one example of steps taken to change the serviceability level of data collection. Serviceability module processing commences at 740, whereupon the serviceability module changes serviceability levels at 745 based upon serviceability state changes 180 received from serviceability module manager 160. At 750, the serviceability module sends a handler call to handler 120 to change the serviceability level, and processing returns at 755.

Handler processing commences at 760, whereupon the handler receives the handler call at 765 and, at 770, the handler stores the new serviceability level settings in configuration store 122 at 770. As a result, the handler collects different data according to the new serviceability level (see FIG. 4 and corresponding text for further details). Handler processing ends at 775.

Figure 8:
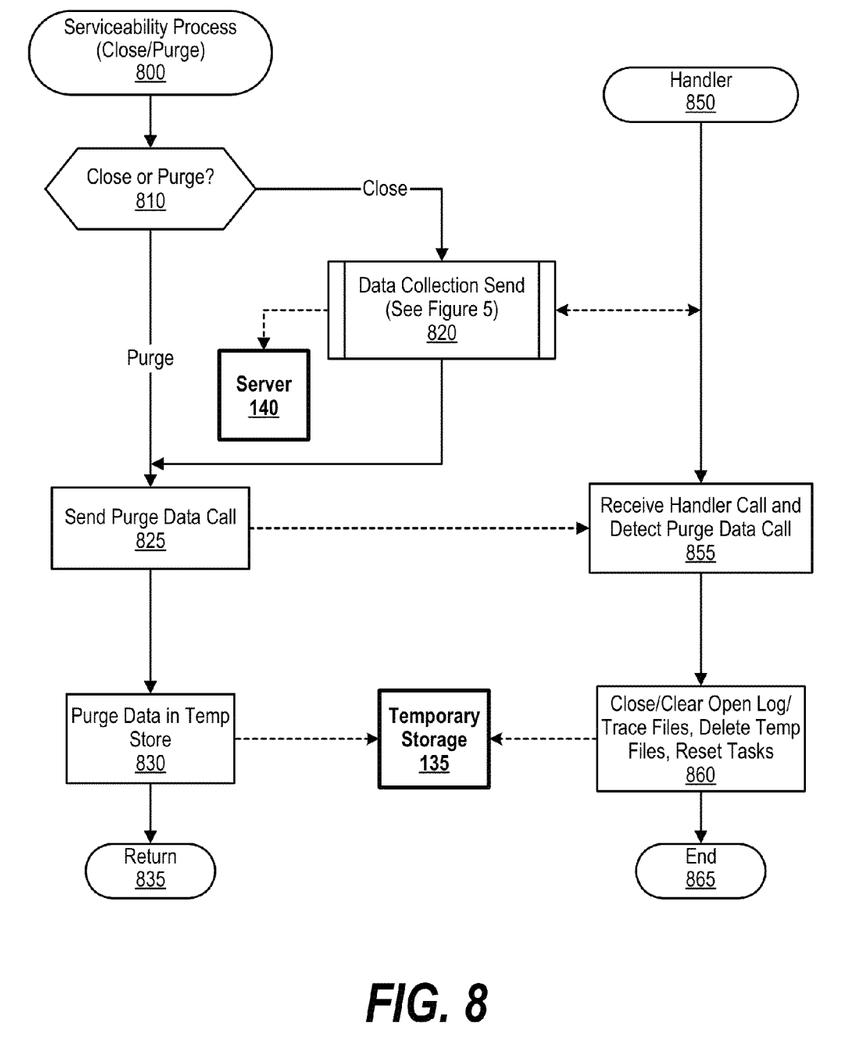
FIG. 8 is a flowchart showing one example of steps taken by the serviceability module to close an application or purge previously collected data.

FIG. 8 is a flowchart showing one example of steps taken by the serviceability module to close an application or purge previously collected data. Serviceability module processing commences at 800, whereupon the serviceability module determines whether a request sent from server 140 corresponds to a close request or a purge request (decision 810). If the request corresponds to a close request, decision 810 branches to the "close" branch and the serviceability module performs steps to communicate with handler 120 to collect and send the data to server 140 (pre-defined process block 820, see FIG. 5 and corresponding text for further details). On the other hand, if the request is a purge request, decision 810 branches to the "Purge" branch, bypassing data collection steps.

At 825, the serviceability module sends a purge data call to the handler and, at 830, the serviceability module purges the data in temporary store 135. Serviceability module processing returns at 835.

Handler processing commences at 850, whereupon the handler receives the handler call at 855. At 860, the handler closes any cache lines in temporary store 135, along with clearing open log/trace files. The handler also deletes any temporary files and resets tasks accordingly. Handler processing ends at 865.

Figure 9:
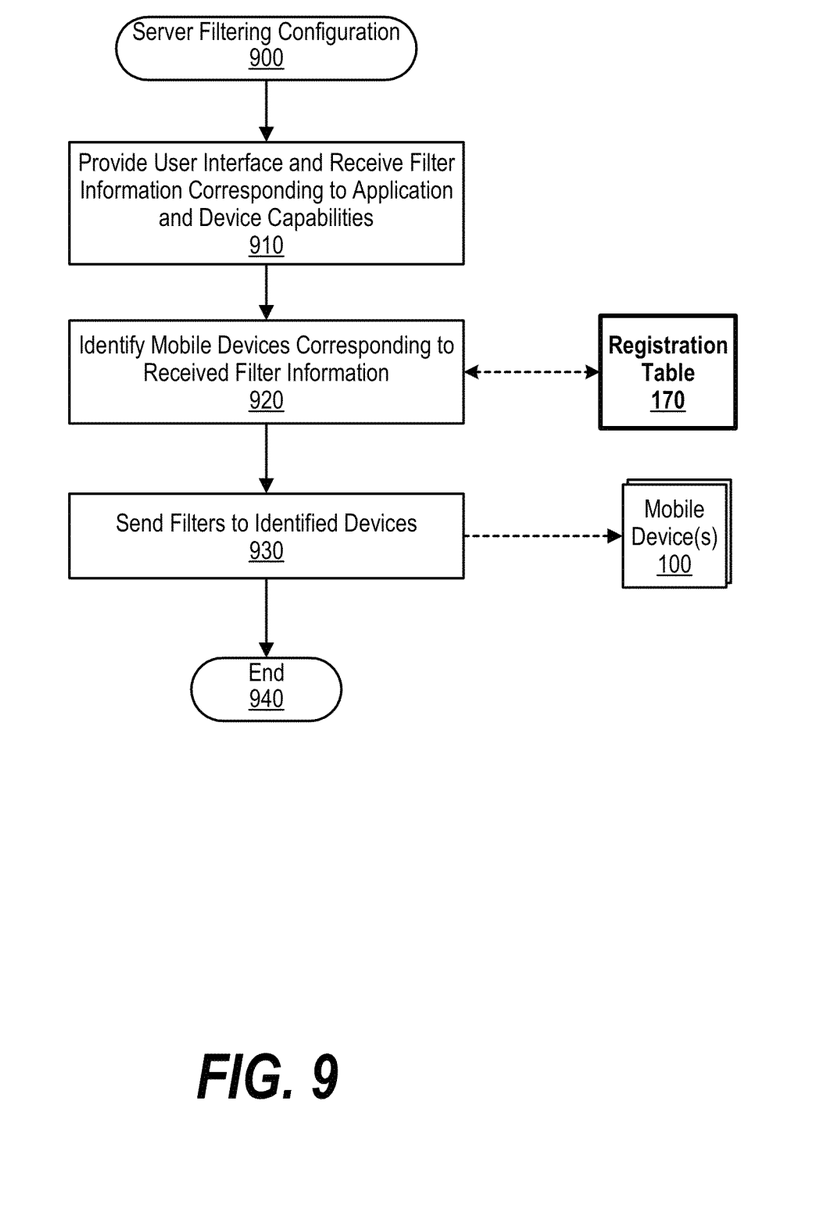
FIG. 9 is a flowchart showing one example of steps taken by a server to selectively send filters to mobile devices based upon a developer request.

FIG. 9 is a flowchart showing one example of steps taken by a server to selectively send filters to mobile devices based upon a developer request. Server processing commences at 900, whereupon the server provides a user interface to a user (user interface 150) and receives filter information corresponding to application and mobile device capabilities (910). At 920, the server identifies mobile devices corresponding to the filters based upon registration table entries included in registration table 170, which were generated when mobile devices register with serviceability module manager 160 shown in FIG. 1.

The server, at 930, sends filters 175 multiple mobile devices (e.g., mobile device 100), which the mobile devices utilize to filter collected serviceability data accordingly. Server processing ends at 940.

Figure 10:
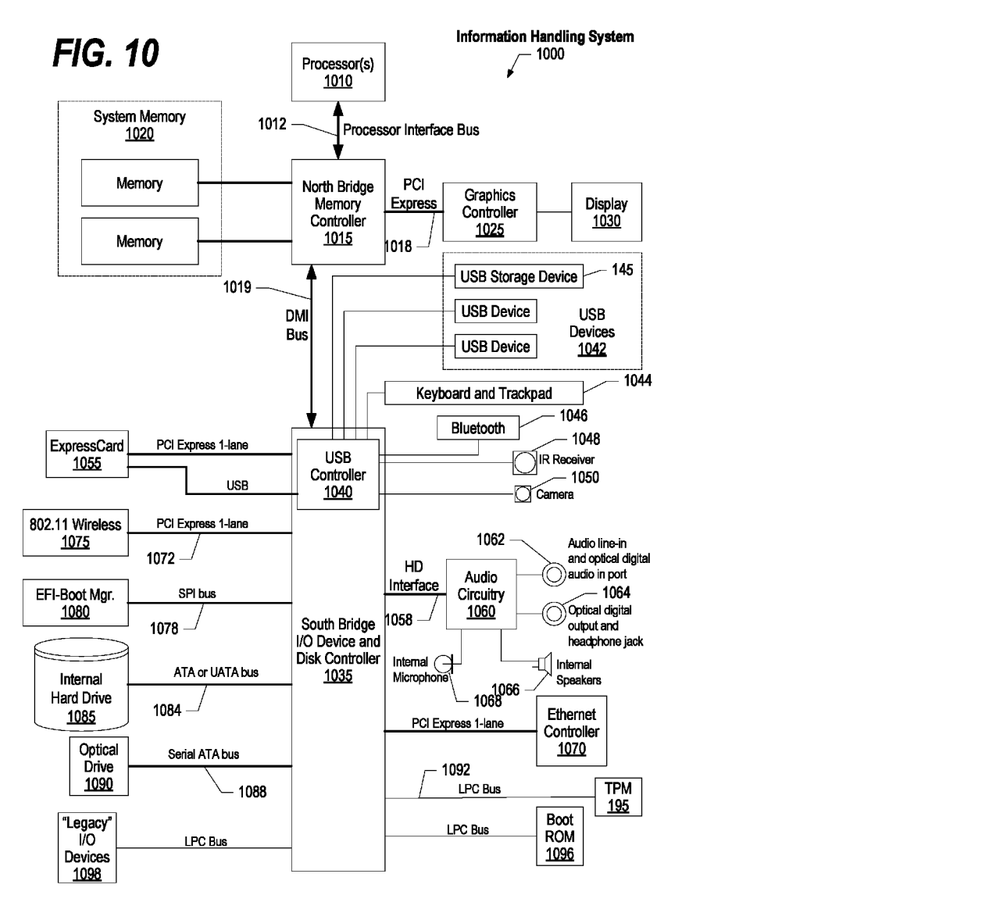
FIG. 10 is a block diagram of a data processing system in which the methods described herein can be implemented.

FIG. 10 illustrates information handling system 1000, which is a simplified example of a computer system capable of performing the computing operations described herein. Information handling system 1000 includes one or more processors 1010 coupled to processor interface bus 1012. Processor interface bus 1012 connects processors 1010 to Northbridge 1015, which is also known as the Memory Controller Hub (MCH). Northbridge 1015 connects to system memory 1020 and provides a means for processor(s) 1010 to access the system memory. Graphics controller 1025 also connects to Northbridge 1015. In one embodiment, PCI Express bus 1018 connects Northbridge 1015 to graphics controller 1025. Graphics controller 1025 connects to display device 1030, such as a computer monitor.

Northbridge 1015 and Southbridge 1035 connect to each other using bus 1019. In one embodiment, the bus is a Direct Media Interface (DMI) bus that transfers data at high speeds in each direction between Northbridge 1015 and Southbridge 1035. In another embodiment, a Peripheral Component Interconnect (PCI) bus connects the Northbridge and the Southbridge. Southbridge 1035, also known as the I/O Controller Hub (ICH) is a chip that generally implements capabilities that operate at slower speeds than the capabilities provided by the Northbridge. Southbridge 1035 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 1096 and "legacy" I/O devices (using a "super I/O" chip). The "legacy" I/O devices (1098) can include, for example, serial and parallel ports, keyboard, mouse, and/or a floppy disk controller. The LPC bus also connects Southbridge 1035 to Trusted Platform Module (TPM) 1095. Other components often included in Southbridge 1035 include a Direct Memory Access (DMA) controller, a Programmable Interrupt Controller (PIC), and a storage device controller, which connects Southbridge 1035 to nonvolatile storage device 1085, such as a hard disk drive, using bus 1084.

ExpressCard 1055 is a slot that connects hot-pluggable devices to the information handling system. ExpressCard 1055 supports both PCI Express and USB connectivity as it connects to Southbridge 1035 using both the Universal Serial Bus (USB) the PCI Express bus. Southbridge 1035 includes USB Controller 1040 that provides USB connectivity to devices that connect to the USB. These devices include webcam (camera) 1050, infrared (IR) receiver 1048, keyboard and trackpad 1044, and Bluetooth device 1046, which provides for wireless personal area networks (PANs). USB Controller 1040 also provides USB connectivity to other miscellaneous USB connected devices 1042, such as a mouse, removable nonvolatile storage device 1045, modems, network cards, ISDN connectors, fax, printers, USB hubs, and many other types of USB connected devices. While removable nonvolatile storage device 1045 is shown as a USB-connected device, removable nonvolatile storage device 1045 could be connected using a different interface, such as a Firewire interface, etcetera.

Wireless Local Area Network (LAN) device 1075 connects to Southbridge 1035 via the PCI or PCI Express bus 1072. LAN device 1075 typically implements one of the IEEE 802.11 standards of over-the-air modulation techniques that all use the same protocol to wireless communicate between information handling system 1000 and another computer system or device. Optical storage device 1090 connects to Southbridge 1035 using Serial ATA (SATA) bus 1088. Serial ATA adapters and devices communicate over a high-speed serial link. The Serial ATA bus also connects Southbridge 1035 to other forms of storage devices, such as hard disk drives. Audio circuitry 1060, such as a sound card, connects to Southbridge 1035 via bus 1058. Audio circuitry 1060 also provides functionality such as audio line-in and optical digital audio in port 1062, optical digital output and headphone jack 1064, internal speakers 1066, and internal microphone 1068. Ethernet controller 1070 connects to Southbridge 1035 using a bus, such as the PCI or PCI Express bus. Ethernet controller 1070 connects information handling system 1000 to a computer network, such as a Local Area Network (LAN), the Internet, and other public and private computer networks.

While FIG. 10 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 1095) shown in FIG. 10 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 11.

Figure 11:
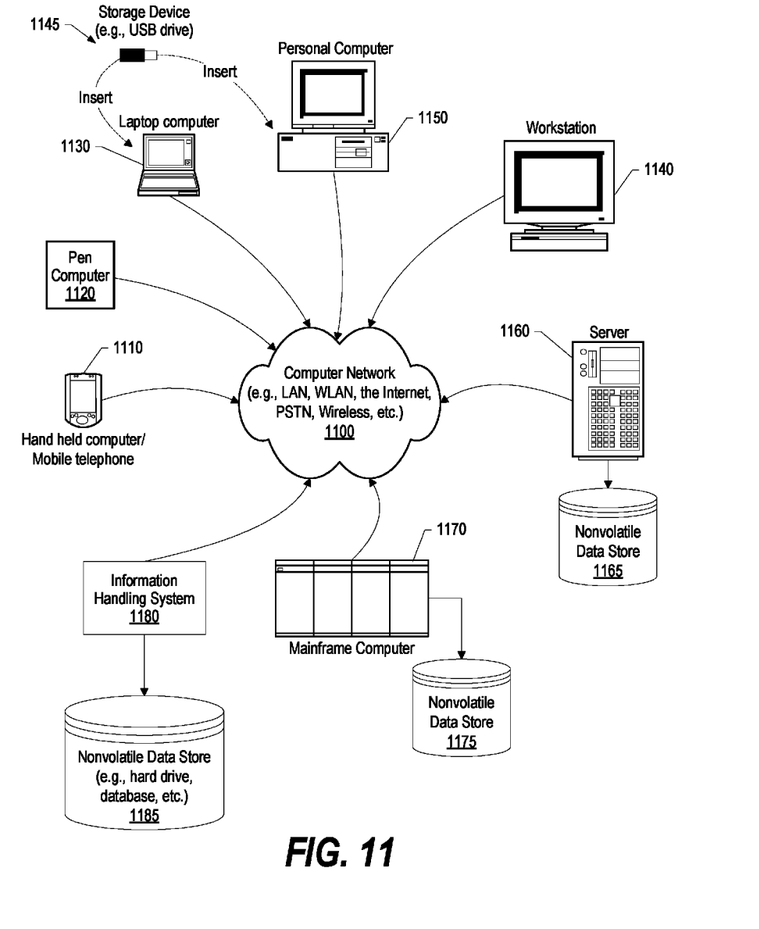
FIG. 11 provides an extension of the information handling system environment shown in FIG. 10 to illustrate that the methods described herein can be performed on a wide variety of information handling systems which operate in a networked environment.

FIG. 11 provides an extension of the information handling system environment shown in FIG. 10 to illustrate that the methods described herein can be performed on a wide variety of information handling systems that operate in a networked environment. Types of information handling systems range from small handheld devices, such as handheld computer/mobile telephone 1110 to large mainframe systems, such as mainframe computer 1170. Examples of handheld computer 1110 include personal digital assistants (PDAs), personal entertainment devices, such as MP3 players, portable televisions, and compact disc players. Other examples of information handling systems include pen, or tablet, computer 1120, laptop, or notebook, computer 1130, workstation 1140, personal computer system 1150, and server 1160. Other types of information handling systems that are not individually shown in FIG. 11 are represented by information handling system 1180. As shown, the various information handling systems can be networked together using computer network 1100. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 11 depicts separate nonvolatile data stores (server 1160 utilizes nonvolatile data store 1165, mainframe computer 1170 utilizes nonvolatile data store 1175, and information handling system 1180 utilizes nonvolatile data store 1185). The nonvolatile data store can be a component that is external to the various information handling systems or can be internal to one of the information handling systems. In addition, removable nonvolatile storage device 1045 can be shared among two or more information handling systems using various techniques, such as connecting the removable nonvolatile storage device 1045 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
one or more processors;
a memory coupled to at least one of the processors;
a set of computer program instructions stored in the memory and executed by at least one of the processors in order to perform actions of:
sending a registration notification to a sever, wherein the registration notification includes a device identifier and an application identifier, the device identifier corresponding to the information handling system and the application identifier corresponding to one of one or more applications executing on a client;
in response to the sending, collecting serviceability data based upon one or more serviceability state changes, wherein the one or more serviceability state changes corresponds to the one or more applications executing on the information handling system;
filtering the collected serviceability data according to one or more collection filter rules, wherein the filtering includes discarding a portion of the collected serviceability data based upon a priority threshold;
identifying a time at which a connection between the information handling system and the server is available to send the filtered serviceability data; and
sending the filtered serviceability data to the server at the identified time.

2. The information handling system of claim 1 wherein the set of computer program instructions, when executed by at least one of the processors, performs further actions of:
receiving the one or more collection filter rules from the server in response to the server matching a filter request, initiated by a developer, with a registration table entry corresponding to the registration notification; and
storing the one or more collection filter rules in the memory.

3. The information handling system of claim 1 wherein the one or more serviceability state changes is received from the server and correspond to one or more states selected from the group consisting of a collection start state, a collection end state, an initialize state, a serviceability level state, a purge state, and a close state.

4. The information handling system of claim 1 wherein the one or more collection filter rules is received from the server and includes a mode identifier that identifies a mode of the information handling system.

5. The information handling system of claim 1 wherein the information handling system includes a serviceability module and a handler, and wherein the set of computer program instructions, when executed by at least one of the processors, performs further actions of:
sending a handler call from the serviceability module to the handler to end data collection; and in response to receiving the handler call at the handler, the handler further comprises:
    closing one or more log files and one or more trace files corresponding to the collection of the serviceability data;
    terminating one or more timers corresponding to the collection of the serviceability data; and
    sending subsequent serviceability data to the serviceability module that was not provided to the serviceability module prior to receiving the handler call to end the data collection.

6. A non-transitory computer readable storage medium having program instructions embodied therewith, the program instructions executable by an information handling system to cause the information handling system to perform actions comprising:
    sending a registration notification to a sever, wherein the registration notification includes a device identifier and an application identifier, the device identifier corresponding to the information handling system and the application identifier corresponding to one of one or more applications executing on a client;
    in response to the sending, collecting serviceability data based upon one or more serviceability state changes, wherein the one or more serviceability state changes corresponds to the one or more applications executing on the information handling system;
    filtering the collected serviceability data according to one or more collection filter rules, wherein the filtering includes discarding a portion of the collected serviceability data based upon a priority threshold;
    identifying a time at which a connection between the information handling system and the server is available to send the filtered serviceability data; and
    sending the filtered serviceability data to the server at the identified time.

7. The non-transitory computer readable storage medium of claim 6 wherein the program instructions executable by the information handling system cause the information handling system to perform further actions comprising:
    receiving the one or more collection filter rules from the server in response to the server matching a filter request, initiated by a developer, with a registration table entry corresponding to the registration notification.

8. The non-transitory computer readable storage medium of claim 6 wherein the one or more serviceability state changes is received from the server and correspond to one or more states selected from the group consisting of a collection start state, a collection end state, an initialize state, a serviceability level state, a purge state, and a close state.

9. The non-transitory computer readable storage medium of claim 6 wherein the one or more collection filter rules is received from the server and includes a mode identifier that identifies a mode of the information handling system.

10. An information handling system comprising:
    one or more processors;
    a memory coupled to at least one of the processors;
    a serviceability module;
    a handler;
    a set of computer program instructions stored in the memory and executed by at least one of the processors in order to perform actions of:
        collecting serviceability data based upon one or more serviceability state changes, wherein the one or more serviceability state changes corresponds to one or more applications executing on the information handling system;
        filtering the collected serviceability data according to one or more collection filter rules;
        sending the filtered serviceability data to a server;
        sending a handler call from the serviceability module to the handler to end data collection; and
        in response to receiving the handler call at the handler:
            closing one or more log files and one or more trace files corresponding to the collection of the serviceability data;
            terminating one or more timers corresponding to the collection of the serviceability data; and
            sending subsequent serviceability data to the serviceability module that was not provided to the serviceability module prior to receiving the handler call to end the data collection.

* * * * *